(No Model.) 2 Sheets—Sheet 1.

J. B. ARMSTRONG.
THILL COUPLING.

No. 310,358. Patented Jan. 6, 1885.

Witnesses.
John G. Ridout
Charles C. Baldwin

Inventor.
John B. Armstrong
by
Donald C. Ridout &c
his Attys.

(No Model.) 2 Sheets—Sheet 2.

J. B. ARMSTRONG.
THILL COUPLING.

No. 310,358. Patented Jan. 6, 1885.

Fig. 3.ᵃ

Witnesses.
John G. Ridout.
Charles C. Baldwin.

Inventor.
John B. Armstrong
by
Donald C. Ridout & Co.
his Attys.

UNITED STATES PATENT OFFICE.

JOHN B. ARMSTRONG, OF GUELPH, ONTARIO, CANADA.

THILL-COUPLING.

SPECIFICATION forming part of Letters Patent No. 310,358, dated January 6, 1885.

Application filed June 13, 1884. (No model.) Patented in Canada February 4, 1884, No. 18,611.

*To all whom it may concern:*

Be it known that I, JOHN BELMER ARMSTRONG, of the city of Guelph, in the county of Wellington, in the Province of Ontario, Canada, manufacturer, have invented certain new and useful Improvements in Road-Vehicles, of which the following is a specification.

The principal object of the invention is to provide a connection between the pole or shafts of the vehicle and the front axle that will lessen any sudden jar to the vehicle caused by coming in contact with any obstacles in the road. My design is also to cheapen the construction of this portion of the vehicle, and to make it lighter and handsomer in appearance, simpler to connect, and not so likely to rattle at the connecting-joints; and it consists, among other things, in providing curved elastic steel draw-bars rigidly secured to the end of the shafts or pole and tapered gradually from a point at or near this connection to their ends, which are hinged or otherwise flexibly connected to the front axle of the vehicle, the draw-jacks upon the axle being specially designed to carry out the object of my invention, while the pole or shafts are braced and otherwise arranged in a manner specially designed by myself.

Figures 1, 4, 7:
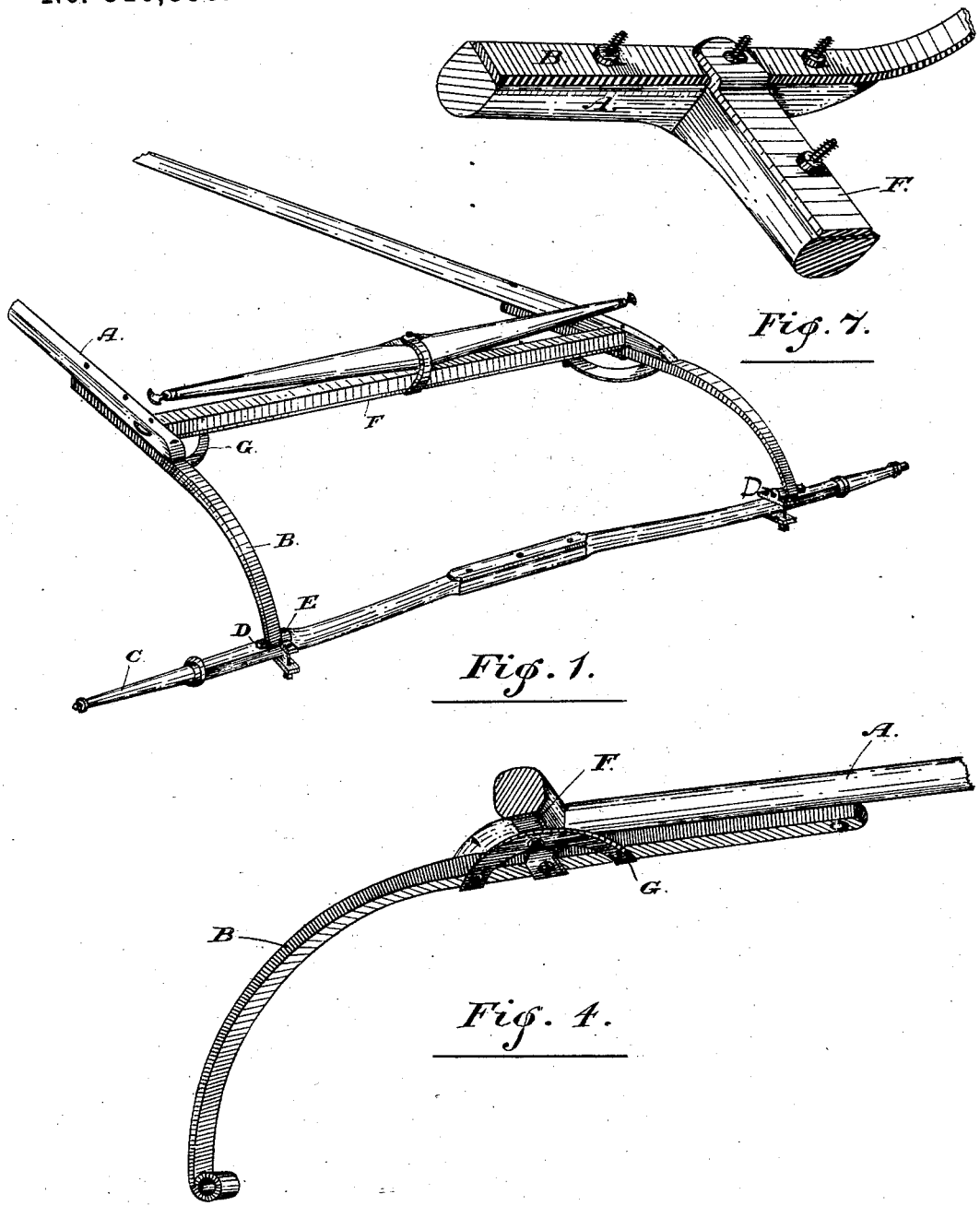
Figure 2:
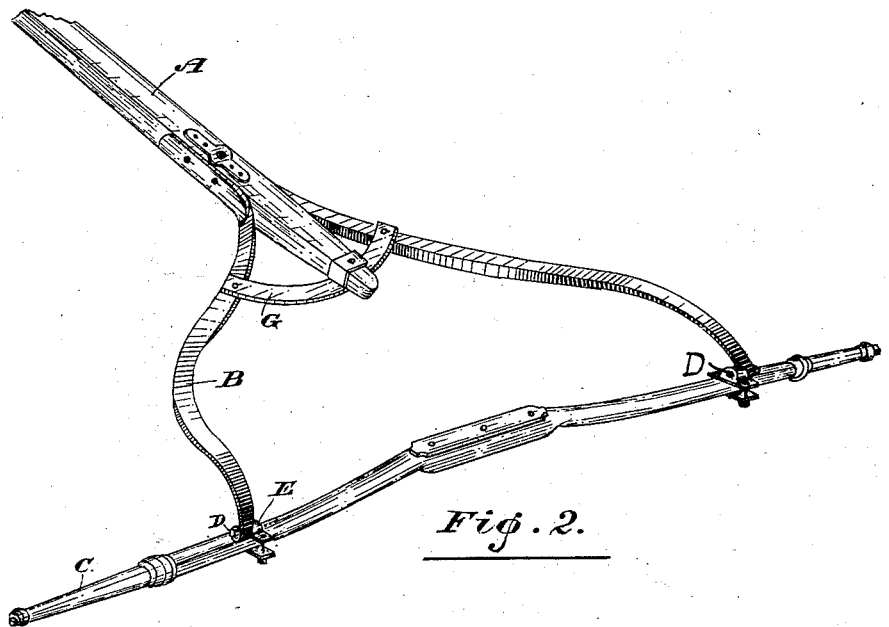
Figure 3:
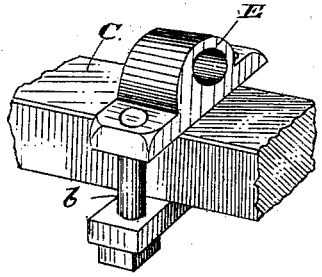
Figure 6:
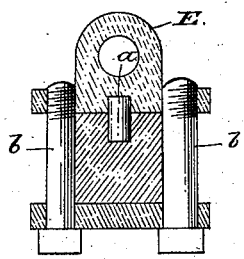
Figure 6:
Figure 5:
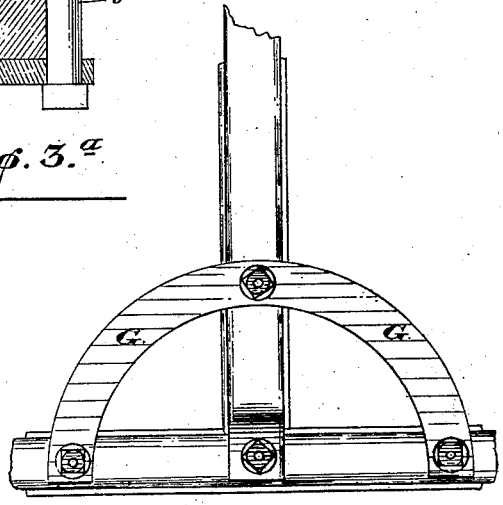

In the drawings, Figure 1 represents a perspective view showing the shafts and front axle constructed and arranged in accordance with my invention. Fig. 2 is a similar view of the pole connected to the axle in accordance with my invention. Fig. 3 is a perspective view showing the manner of attaching the draw-jack to the axle. Fig. 3ª is a cross-section through the axle and draw-jack. Fig. 4 is a perspective view showing the tapered draw-bar connected to one shaft. Fig. 5 is an enlarged bottom plan showing the semicircular brace for strengthening the connection between the cross-bar and draw-bars. Fig. 6 is a sectional elevation showing the re-enforced hole used in connecting the plates together. Fig. 7 is a perspective detail showing re-enforced holes in bars B and F.

In the drawings like letters indicate corresponding parts in each figure.

A represents the shafts or pole of the vehicle. Instead of connecting these, as is customary, by a connection which is inflexible, I provide curved elastic steel draw-bars B, rigidly secured to the pole or shafts of the vehicle and tapered gradually from a point at or near the connection to the wheel. They are flexibly connected to the front axle, C, either in the usual way or by a draw-jack specially constructed for the purpose, and rigidly secured to the axle, as indicated.

In order to obtain the desired elasticity and equalize the strain on the stock in the draw-bars B, I taper them, as before stated, toward their rear end, so that the principal springing motion will take place at a point near that at which they are hinged to the axle.

As shown in Fig. 1, it will be seen that the draw-pin D is removably fastend to the end of the draw-bar B at right angles, and is tapered so as to fit into a corresponding hole made in the draw-jack E. By having the pin thus tapered any lost motion which may be produced by wear will be gradually taken up by the taper, and as a consequence the rattling which would otherwise occur at this point is prevented.

Owing to the flexibility of the draw-bars B, I am enabled, when the draw-pin D is used, to form a connection between them and the draw-jack by simply springing them apart sufficiently to allow the draw-pins to spring into the holes in the draw-jack, which draw-jacks are placed upon the axle in such a position that the edges of the draw-bar will be close to either the inner or outer edges of the draw-jack when the draw-pins have been sprung into the holes through the draw-jacks.

As shown in Figs. 1 and 2, the draw-jacks are set inside of the draw-bars; but of course the same effect can be produced by placing them on the outside, the only difference being that in forming the connection in the first instance the draw-bars will be sprung outwardly, while in the latter instance they would be sprung together, the draw-pin being arranged to project either on the inside or outside of the draw-bars, as may be required.

In order to secure the draw-jack E to the axle, I provide a small dowel-pin, *a*, fitted into holes made in the draw-jack and the axle, as shown in Fig. 3ª. This pin holds the draw-jack rigidly in any position it is placed upon the axle, and prevents its having any lateral movement thereon. The screw-bolts *b*, which pass through a plate on the side of the axle opposite to that upon which the draw-jack is situated, and are screwed into the flanges of the draw-jack, as shown, form an easy and effectual means of securing the jack in its required position.

In order to secure the shafts together, I connect them by a steel cross-bar, F, connecting it to the draw-bar B by bolts or rivets, a reenforced hole formed in the cross-bar or drawbar relieving the lateral strain which would otherwise be exerted upon the rivet or bolt completing the connection. A semicircular brace, G, is secured to the draw-bars and cross-bars, and forms a rigid brace at the junction between them by fitting over re-enforced holes. A similar brace, G, is connected at either end to the draw-bars by also fitting over re-enforced holes and centrally fastened to the end of a pole when a pole is used instead of shafts, the brace producing practically the same effect in either case.

What I claim as my invention is—

1. The combination, with the axle C and the draw-jacks E, having tapering holes and rigidly secured to the axle, of the spring draw-bars B and the rigid tapering pins D, detachably secured to the draw-bars, the parts being constructed and arranged to automatically take up the wear and prevent rattling, whereby the pins may be removed when worn, substantially as described.

2. In road-vehicles provided with shafts or pole, curved elastic steel draw-bars rigidly secured to the end of the shaft or pole, and having at their ends draw-pins set at right angles to the bars, and arranged to be sprung into draw-jacks attached to the front axle of the vehicle.

3. In road-vehicles provided with a thill or pole, curved elastic steel draw-bars rigidly secured to said thill or pole, and provided with tapered draw-pins set at right angles to the bars, in combination with draw-jacks having tapered holes to receive the draw-pins, and rigidly secured to the front axle, the parts being constructed and arranged substantially as specified, whereby when the pins are sprung into place the edges of the bars will approach close to the edges of the jacks, as and for the purpose set forth.

4. In road-vehicles provided with a metal front axle, a draw-jack connected to the said axle by a pin or stud, $a$, fitting in recesses in the draw-jack and axle, and secured in position by screw-bolts, one on either side of the axle, and passing through a plate situated on the side of the axle opposite to that upon which the draw-jack is situated.

5. In road-vehicles, the metal draw-bars B, provided with re-enforced openings, a metal cross-bar, F, running from one draw-bar to the other, and provided with offset ends having an opening to fit over one of the re-enforcements of said draw-bars, and provided with a re-enforced hole at a distance from each end, in combination with a semicircular brace to engage the re-enforcements on either side of the junction of the bars F and B, and engage the re-enforcement near the end of the bar F, substantially as and for the purposes described.

6. In combination with the thill or pole of a vehicle, a spring draw-bar having its upper and lower surfaces gradually approaching each other, said bar being rigidly attached at one end to the thill or pole and extending therefrom in a rearward direction, its opposite end curving downwardly and being pivotally connected to the axle, as and for the purposes specified.

J. B. ARMSTRONG.

Witnesses:
WM. E. SLAKES,
H. ARMSTRONG.